United States Patent
Kim et al.

(10) Patent No.: US 9,823,812 B2
(45) Date of Patent: Nov. 21, 2017

(54) METHOD AND SYSTEM FOR PROVIDING NUI

(75) Inventors: Jae Ho Kim, Yongin-si (KR); Ha Gyeong Sung, Suwon-si (KR); Kwang Ho Won, Yongin-si (KR); Sang Shin Lee, Yongin-si (KR); Il Yeup Ahn, Namyangju-si (KR); Min Hwan Song, Seoul (KR); Jae Seok Yoon, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 568 days.

(21) Appl. No.: 14/362,369

(22) PCT Filed: Dec. 27, 2011

(86) PCT No.: PCT/KR2011/010137
§ 371 (c)(1),
(2), (4) Date: Jun. 2, 2014

(87) PCT Pub. No.: WO2013/081239
PCT Pub. Date: Jun. 6, 2013

(65) Prior Publication Data
US 2014/0331144 A1 Nov. 6, 2014

(30) Foreign Application Priority Data
Dec. 2, 2011 (KR) ........................ 10-2011-0128658

(51) Int. Cl.
*G06F 3/048* (2013.01)
*G06F 3/0482* (2013.01)
*H04L 29/08* (2006.01)

(52) U.S. Cl.
CPC .......... *G06F 3/0482* (2013.01); *H04L 67/025* (2013.01)

(58) Field of Classification Search
CPC .......... G06F 17/30126; G06F 19/3406; G06F 17/3089; G06F 2209/545; G06F 9/4445
(Continued)

(56) References Cited

U.S. PATENT DOCUMENTS 5,886,697 A    3/1999  Naughton et al.
6,587,872 B2 * 7/2003  Hirasawa ................ G06F 21/41
                                          380/232

(Continued)

FOREIGN PATENT DOCUMENTS

JP    2008046681 A      2/2008
KR    10-2005-0083406 A 8/2005
(Continued)

OTHER PUBLICATIONS

European Search Report for corresponding European Patent Application No. 11876660.9 dated Nov. 17, 2015.
(Continued)

*Primary Examiner* — Matthew Ell
(74) *Attorney, Agent, or Firm* — Hauptman Ham, LLP

(57) ABSTRACT

A method and system for providing a Network-based User Interface (NUI) is provided. The method for providing the NUI includes: selecting one from among devices connected to a network; acquiring a UI regarding the selected device through the network; and interacting with the device by using the acquired UI. Accordingly, the user terminal can acquire the UI regarding the device connected to the network through the network and interact with the device, so that the user can easily manipulate the device at a remote distance and can easily grasp the statue of the device.

8 Claims, 8 Drawing Sheets

(58) Field of Classification Search
USPC .......................................................... 715/765
See application file for complete search history.

(56) References Cited

U.S. PATENT DOCUMENTS

| | | | | |
|---|---|---|---|---|
| 6,628,304 | B2* | 9/2003 | Mitchell | ............... G06F 3/0481 |
| | | | | 715/734 |
| 7,293,067 | B1* | 11/2007 | Maki | ..................... H04L 41/044 |
| | | | | 709/217 |
| 9,041,622 | B2* | 5/2015 | McCulloch | .......... G02B 27/017 |
| | | | | 345/7 |
| 2010/0205274 | A1* | 8/2010 | Gharabally | ............... G06F 8/61 |
| | | | | 709/217 |
| 2010/0241966 | A1 | 9/2010 | Kim et al. | |
| 2011/0196915 | A1 | 8/2011 | Kim et al. | |

FOREIGN PATENT DOCUMENTS

| | | |
|---|---|---|
| KR | 10-0653209 B1 | 12/2006 |
| KR | 1020070107578 A | 11/2007 |
| KR | 10-2010-0004390 A | 1/2010 |
| KR | 1020110020694 A | 3/2011 |
| WO | 03007588 A2 | 1/2003 |

OTHER PUBLICATIONS

Korean Office Action dated Apr. 27, 2013 for corresponding Korean application No. 10-2011-0128658.
International Search Report dated Dec. 12, 2012 for PCT/KR2011/010137.

* cited by examiner

METHOD AND SYSTEM FOR PROVIDING NUI

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Dec. 2, 2011, and assigned Serial No. 10-2011-0128658, the entire disclosure of which is hereby incorporated by reference.

TECHNICAL FIELD OF THE INVENTION

The present invention relates generally to a method and system for providing a User Interface (UI), and more particularly, to a method and system for providing a Network-based User Interface (NUI), which provides UIs for devices connected to a network.

BACKGROUND OF THE INVENTION

A device which requires a user's manipulation should provide a UI for manipulating. The UI should be provided through a display or a touch screen, which is a factor in the increase of a manufacturing cost of the device.

However, in the case of a device which performs a relatively simple function, or a device which is not manipulated by a user very often, the increase in the manufacturing cost due to the above factor is irrational.

In addition, in order to change the UI of the device or add a new UI, the device itself should be changed. This leads to many works to the extent that a new device is developed.

SUMMARY OF THE INVENTION

To address the above-discussed deficiencies of the prior art, it is a primary aspect of the present invention to provide a method and system for providing an NUI, which acquires a UI regarding a device connected to a network through the network and interacts with the device.

According to one aspect of the present invention, a method for providing a Network-based User Interface (NUI) includes: selecting one from among devices connected to a network; acquiring a UI regarding the selected device through the network; and interacting with the device by using the acquired UI.

The acquiring may include acquiring an application which provides the UI regarding the selected device through the network.

The acquiring may include acquiring a page for a browser which provides the UI regarding the selected device through the network.

The method may further include: requesting a device search; and receiving a device list of searched devices as a response to the request, and the selecting may include selecting one from among the devices listed in the device list.

The acquiring may include acquiring the UI regarding the selected device from a server through the network, and the interacting may include interacting with the device directly or indirectly via the server.

The selecting may include: displaying an electronic map browser on which devices are displayed; and selecting one from among the devices displayed on the electronic map browser.

The devices may be stratified, and the selecting may include, when a device of a higher level is selected, displaying devices of a lower level which belong to the device of the higher level.

The method may further include automatically changing a kind of electronic map of the electronic map browser according to a level of devices displayed on the electronic map browser.

The method may further include changing the electronic map browser to a previous browser screen or a next browser screen according to a user command.

A display of the devices may be limited according to a distance from a user and a security level of the user.

The selecting may include displaying an electronic map browser on which graphic items are displayed; and regarding a device which is assigned to a graphic item selected from among the graphic items displayed on the electronic map browser as being selected.

The graphic item may be one of a person and a place.

According to another aspect of the present invention, a system for providing an NUI includes: a server configured to retain UIs regarding devices connected to a network; and a terminal configured to acquire a UI regarding a device from the server through the network and interact with the device by using the acquired UI.

According to the present invention as described above, the user terminal can acquire the UI regarding the device connected to the network through the network and interact with the device, so that the user can easily manipulate the device at a remote distance and can easily grasp the statue of the device through the user terminal.

In addition, since the electronic map browser and the stratified device structure are used, it is easy to select the device and the user may enjoy manipulating the device.

In addition, the UI of the device can be easily changed and can be distributed to many users in a simple method.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
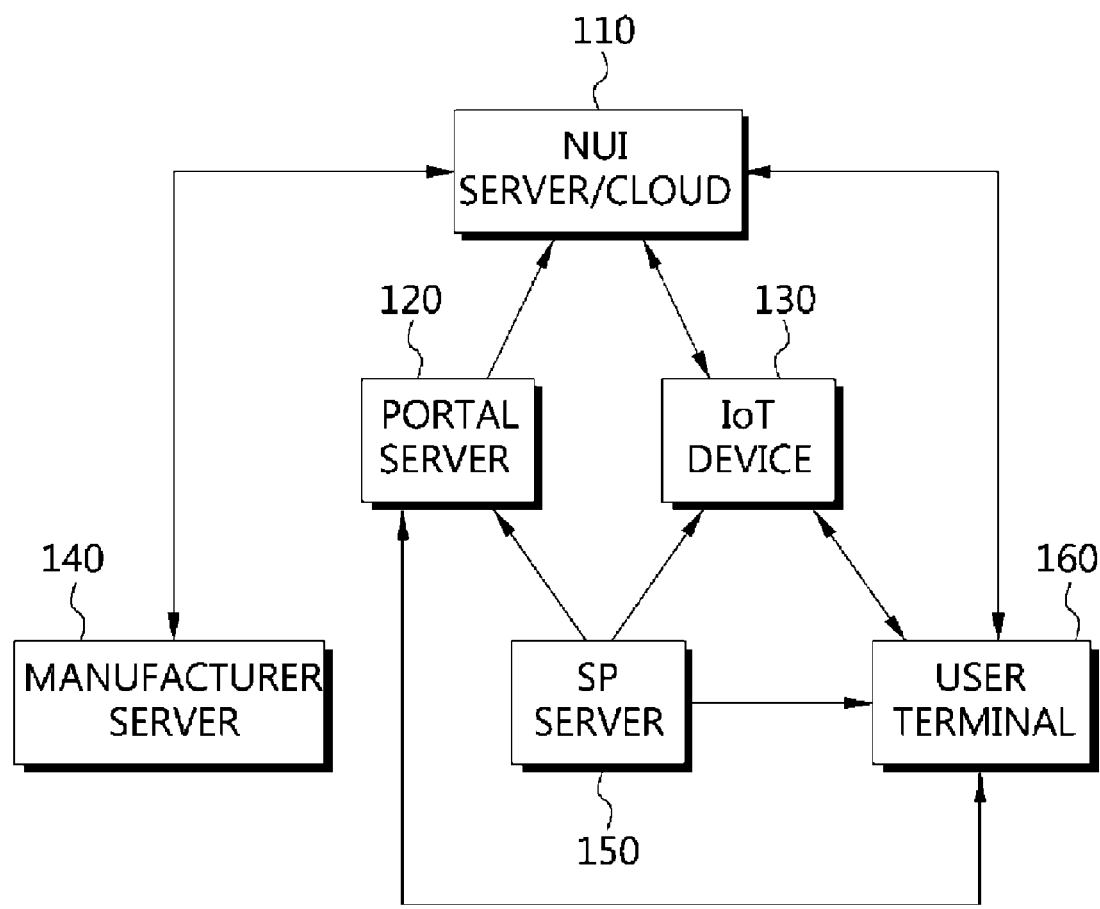
FIG. 1 is a view illustrating a system for providing an NIU to which the present invention is applicable.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Exemplary embodiments of the present invention provide a method for providing a Network-based User Interface (NUI) in an Internet of Thing (IoT).

1. NUI for IoT

The NUI suggested in exemplary embodiments of the present invention refers to a User Interface (UI) for an environment in which all things are connected to the Internet. The NUI is different from a general type of UI, which directly exists in a device, in that the NUI interacts with the UI of the device through a network.

The UI of the device may be provided not only as an application which is independently executed on an operating system (OS), but also as a web page on a browser.

The UI of the device may be manufactured by a device manufacturer and stored in a server or a storage on the network. Accordingly, a user who intends to use the device can acquire the UI of the device through the network. The UI of the device may be manufactured by a professional software developer in addition to the device manufacturer.

FIG. 1 is a view illustrating a system for providing an NUI to which the present invention is applicable. As shown in FIG. 1, the system for providing the NUI is established by connecting an NUI server/cloud 110, a portal server 120, an IoT device 130, a manufacturer server 140, a Service Provider (SP) server 150, and a user terminal 160 to one another.

The NUI server/cloud 110 is a server and/or cloud which owns a UI of the IoT device 130. The portal server 120 is a server which manages a portal service, and the service includes an electronic map providing service.

The IoT device 130 refers to any device which can perform a specific function for a specific purpose. Although only one IoT device 130 is illustrated in FIG. 1 for convenience of illustration and explanation, a plurality of IoT devices 130 may exist in practice.

The manufacturer server 140 is a server which is managed by a manufacturer of the IoT device 130, and uploads the UI of the IoT device 130 to the NUI server/cloud 110.

The SP server 150 is a server which manages an NUI providing service and provides information on the IoT device 130 to the portal server 120 to register the information on the IoT device 130 at the electronic map. The information on the IoT device 130 which is registered includes a name and an installation location of the IoT device 130, user information, and a hierarchical relationship with other IoT devices.

The user terminal 160 is a terminal which is carried by the user who intends to use the IoT device 130.

2. Process for Providing NUI

Hereinafter, a process of using the IoT device 130 through the user terminal 160 will be explained in detail. Specifically, the user terminal 160 acquires the UI of the IoT device 130 from the NUI server/cloud 110, provides the UI to the user through a display/touch screen, and allows the user to use the IoT device 130.

Figure 2:
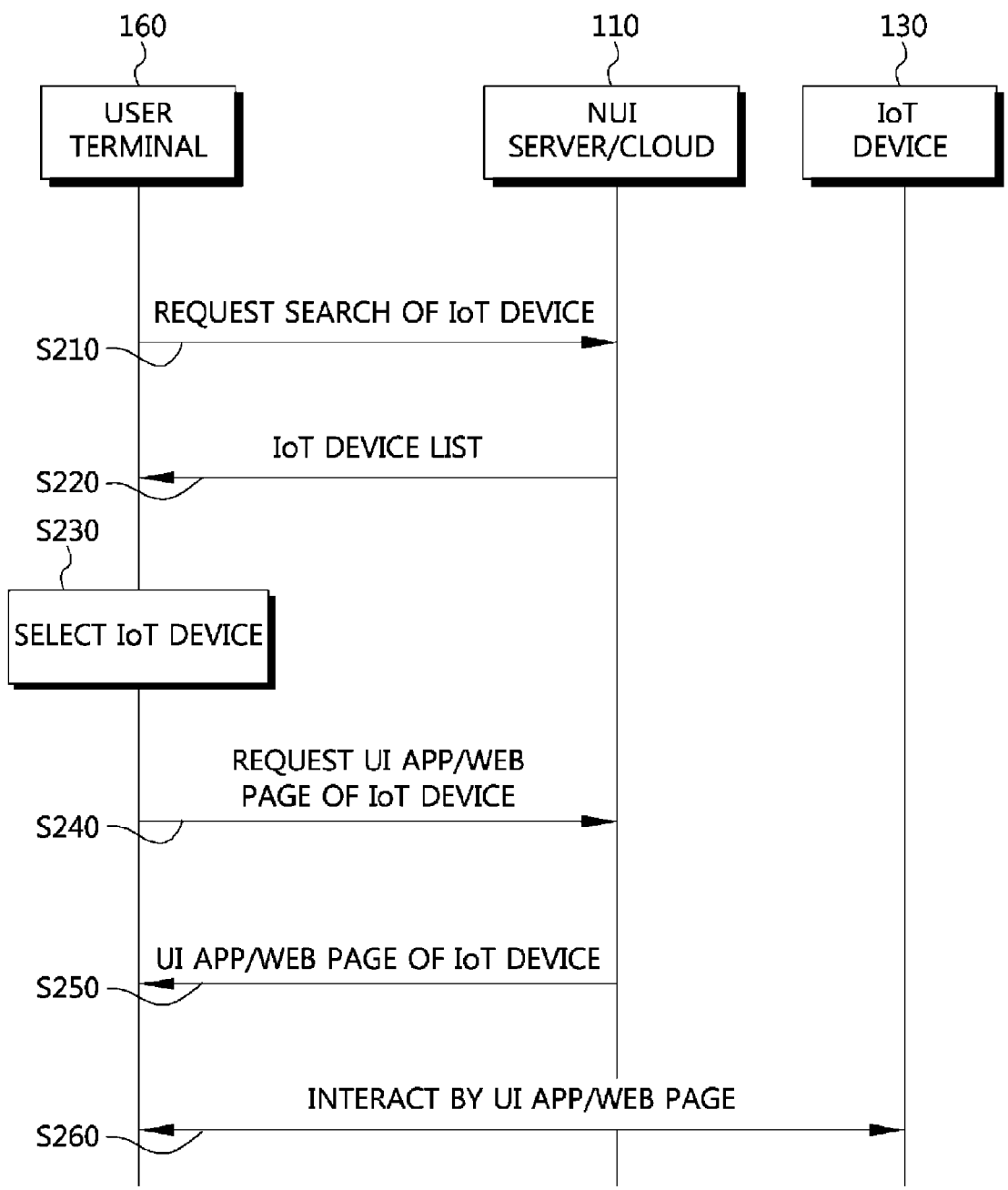
FIG. 2 is a view illustrating a method for providing an NUI according to an exemplary embodiment of the present invention.

FIG. 2 is a view illustrating a method for providing an NUI according to an exemplary embodiment of the present invention.

As shown in FIG. 2, when the user terminal 160 requests the NUI server/cloud 110 to search the IoT device by inputting a search term (S210), the NUI server/cloud 110 provides a list of searched IoT devices to the user terminal 160 (S220).

Instead of inputting the search term, the user terminal 160 may request the NUI server/cloud 110 to search neighboring IoT devices by inputting location information of the user terminal 160 as a query or may request the NUI server/cloud 110 to search IoT devices located in a specific region by inputting location information of the region as a query.

The location of the user terminal 160 may be automatically acquired through a Global Positioning System (GPS) module, or may be indicated by the user through the electronic map. The specific region may be indicated by the user through the electronic map.

In operation S220, the list may include images and location information of the searched IoT devices in addition to the names.

The list of IoT devices provided by the NUI server/cloud 110 in operation S220 is provided to the user through the display/touch screen of the user terminal 160. Accordingly, the user may select a desired IoT device 130 (S230).

Thereafter, the user terminal 160 requests a UI regarding the IoT device 130 selected by the user in operation S230 from the NUI server/cloud 110 (S240), and receives and acquires the UI regarding the IoT device 130 from the NUI server/cloud 110 as a response to the request (S250).

The UI regarding the IoT device 130 may be provided not only as an application but also as a web page. Accordingly, the requesting/acquiring in operation S240/S250 may include requesting/acquiring the application for providing the 'IoT device UI' or requesting/acquiring the 'web page on which the IoT device UI is displayed'.

The UI application is executed independently from other applications on the OS and provides the UI regarding the IoT device 130 when being executed. In addition, the UI webpage is generated as a UI by a web browser.

The user terminal 160 interacts with the IoT device 130 by using the UI of the IoT device 130 acquired in operation S250 (S260). Accordingly, the user can manipulate the IoT device, grasp a status of the IoT device, and acquire data from the IoT device through the user terminal 160.

In operation S260, the user terminal 160 may interact with the IoT device 130 not only through direct communication but also through indirect communication. The direct communication refers to a method for directly connecting the user terminal 160 an the IoT device 130 and making them interact with each other, and the indirect communication refers to a method for indirectly connecting the user terminal 160 and the IoT device 130 via the NUI server/cloud 110 and making them interact with each other.

To perform direct communication, the user terminal 160 is required to acquire information necessary for connecting to the IoT device 130 from the NUI server/cloud 110 in advance.

Operations S210 and S220 may be omitted and the method may start from operation S230. For example, an ID of the IoT device 130 is acquired through a Quick Response (QR) code, a bar code, a Radio Frequency Identification (RFID) tag, and a Near Field Communication (NFC) chip and the IoT device 130 may be regarded as being selected by the ID of the IoT device 130.

3. Selecting IoT Device by Using Electronic Map

Hereinafter, a method for selecting the IoT device 130 through an electronic map browser will be explained as an example of operation S230.

Figure 3:
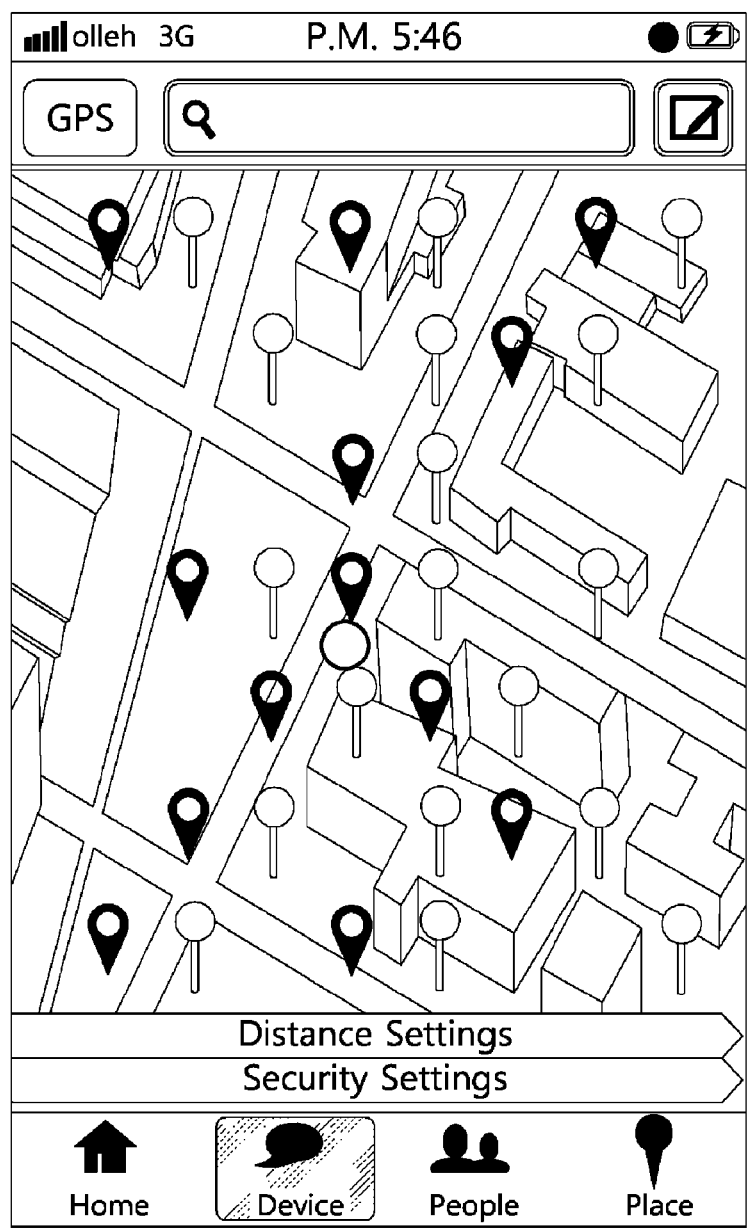
FIG. 3 is a view illustrating an example of an electronic map browser.

FIG. 3 is a view illustrating an example of an electronic map browser. The electronic map browser shown in FIG. 3 shows a plurality of selectable IoT devices and the user can select one from among the IoT devices.

As indicated in a lower portion of FIG. 3, the electronic map browser can filter the IoT devices to be displayed on the electronic map browser according to a "distance" and a "security level". Specifically, a distance between the IoT device to be displayed on the electronic map browser and the user may be limited and the selectable IoT devices may be limited according to the security level of the user.

The electronic map browser shown in FIG. 3 is suitable for selecting the IoT device 130 to manipulate, grasp a status, and acquire data through the user terminal 160, but it should be understood that the electronic map browser is not limited to this purpose.

Figure 4:
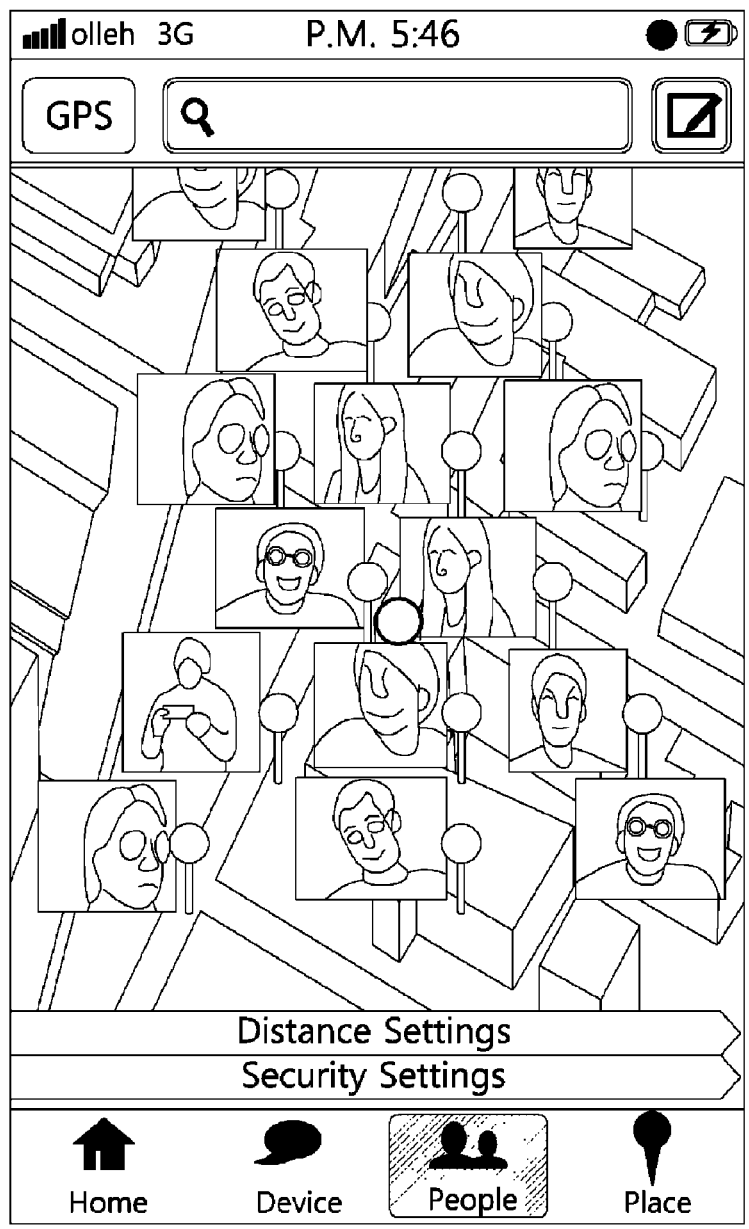
FIG. 4 is a view illustrating another example of the electronic map browser.

FIG. 4 is a view illustrating another example of the electronic map browser. The electronic map browser shown in FIG. 4 shows a plurality of selectable persons and the user may select one from among the displayed persons.

Like the electronic map browser shown in FIG. 3, the electronic map browser shown in FIG. 4 can filter the persons according to a "distance" and a "security level".

The electronic map browser of FIG. 4 is suitable for selecting an IoT device 130 of a person to whom the user will make a call or a video call, send an e-mail, send an Short Message Service (SMS) message, perform social networking, or chat through the user terminal 160. However, it should be understood that the electronic map browser is not limited to this purpose.

Figure 5:
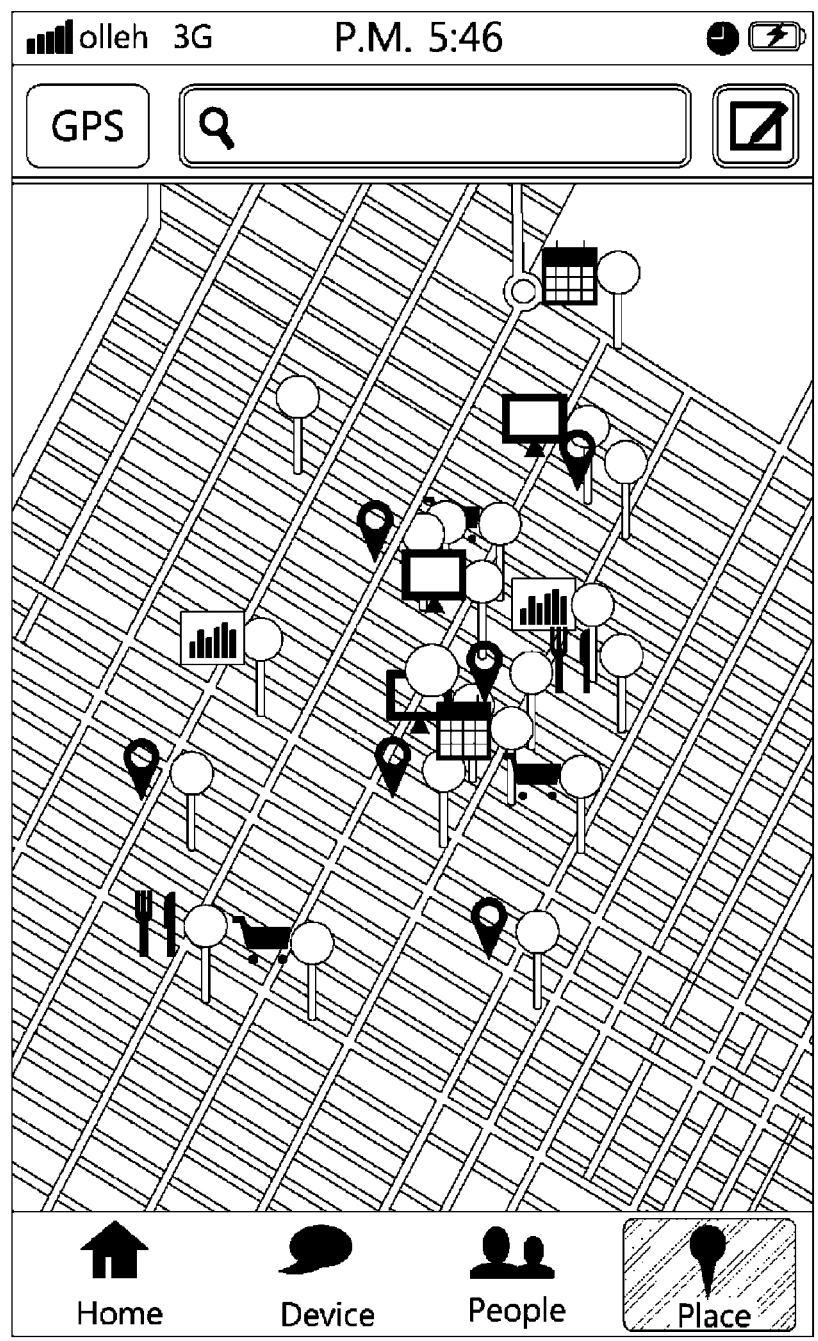
FIG. 5 is a view illustrating another example of the electronic map browser.

FIG. 5 is a view illustrating still another example of the electronic map browser. The electronic map browser of FIG. 5 shows a plurality of selectable places and the user may one from among the displayed places.

Like the electronic map browser of FIGS. 3 and 4, the electronic map browser of FIG. 5 can filter the places according to a "distance" and a "security level".

The electronic map browser of FIG. 5 is suitable for selecting an IoT device 130 to shop, reserve, apply, and receive information at a corresponding region through the user terminal 160. However, it should be understood that the electronic map browser is not limited to this purpose.

The selectable persons and places displayed on the electronic map browser shown in FIGS. 4 and 5 are a kind of selectable graphic items displayed on the electronic map browser and the technical idea of the present invention is applicable to other kinds of graphic items.

4. Hierarchical Structure of IoT Devices

The IoT devices 130 existing on the network may be stratified. That is, IoT devices on a lower level may be configured to belong to IoT devices on a higher level.

Figure 6:
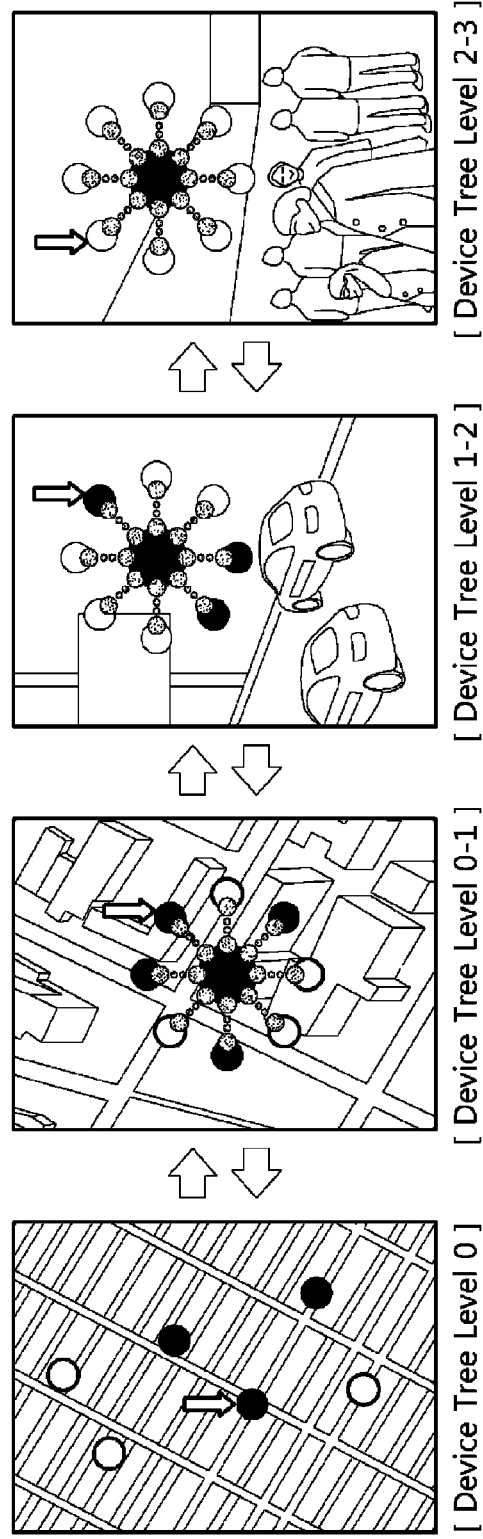
FIG. 6 is a view illustrating a method for showing stratified IoT devices.

Accordingly, when IoT devices of "Level 0", which is the top level, are displayed on the electronic map browser and one of them is selected as shown in the first view of FIG. 6, the selected device of "Level 0" and IoT devices of "Level 1" belonging to the selected device of "Level 0" are displayed on the electronic map browser as shown in the second view of FIG. 6.

Thereafter, when one of the IoT devices of "Level 1" displayed on the electronic map browser as shown in the second view of FIG. 6 is selected, the selected IoT device of "Level 1" and IoT devices of "Level 2" belonging to the IoT device of "Level 1" are displayed on the electronic map browser as shown in the third view of FIG. 6.

When one of the IoT devices of "Level 2" displayed on the electronic map browser as shown in the third view of FIG. 6 is selected, the selected IoT device of "Level 2" and IoT devices of "Level 3" belonging to the IoT device of "Level 2" are displayed on the electronic map browser as shown in the fourth view of FIG. 6.

As shown in FIG. 6, The IoT devices of the higher level and the IoT devices of the lower level are connected with one another through a line, thereby showing their hierarchical relationship.

Figure 7:
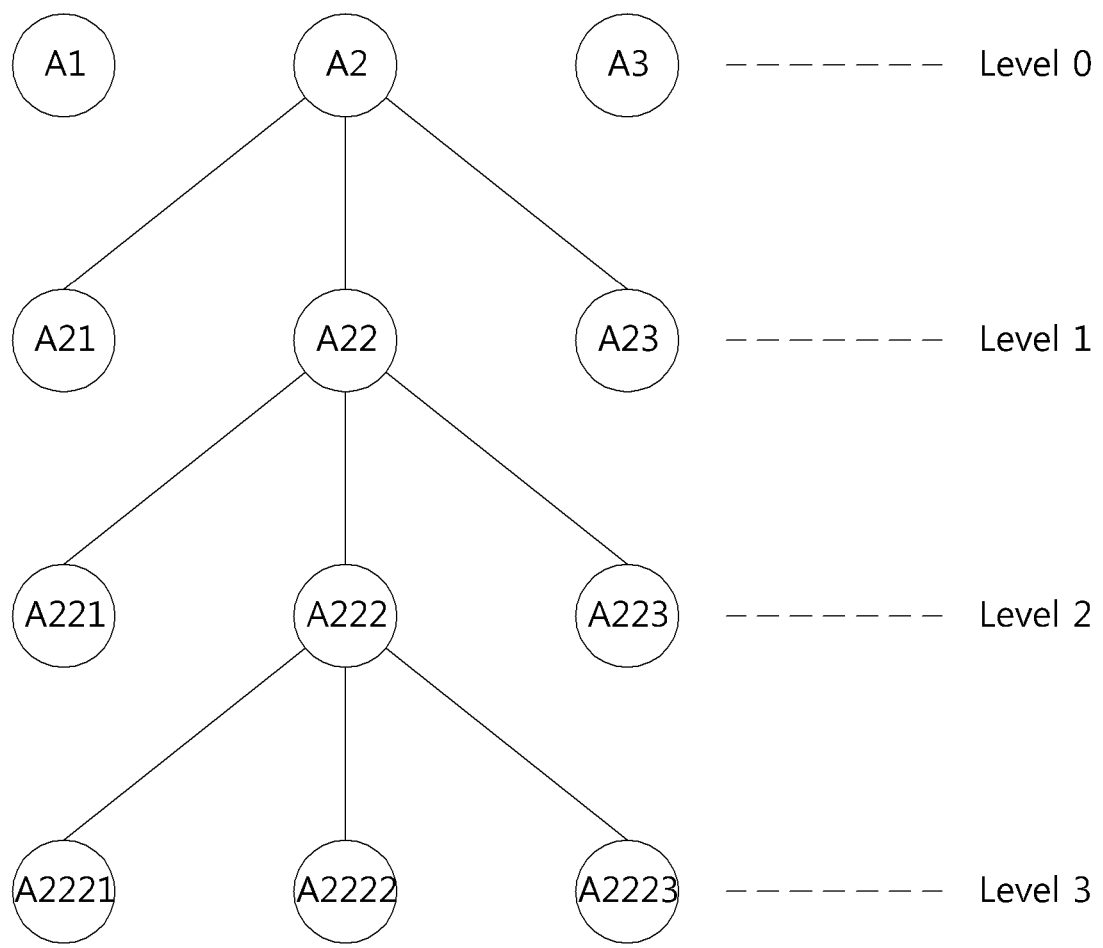
FIG. 7 is a view illustrating a hierarchical structure of IoT devices.

FIG. 7 illustrates a hierarchical structure of IoT devices. As shown in FIG. 7, the IoT devices are stratified by four levels and the operation of stratifying may be varied.

The IoT devices shown in FIG. 7 may be really existing devices or virtually existing devices. The real device and the virtual device may be distinguished from each other by color. Any IoT device which is stratified has a UI, which is retained in the NUI server/cloud 110. Accordingly, the user terminal 160 can acquire the UIs regarding all of the IoT devices from the NUI server/cloud 110 regardless of the levels that the IoT devices belong to and can interact with the IoT devices.

The kind of the electronic map may be automatically changed according to the level of the IoT devices displayed on the electronic map browser. The auto change of the kind of the electronic map may include an auto change of a degree of precision of the electronic map or an auto change of a view type of the electronic map. That is, as shown in FIG. 6, 1) when the IoT devices of "Level 0" are displayed on the electronic map browser, the electronic map is displayed as a general map,
2) when the IoT devices of "Level 0-1" are displayed on the electronic map browser, the electronic map is displayed as a satellite map,
3) when the IoT devices of "Level 1-2" are displayed on the electronic map browser, the electronic map is displayed as a road view map, and
4) when the IoT devices of "Level 2-3" are displayed on the electronic map browser, the electronic map is displayed as a building interior view map.

In addition, the electronic map browser may have a 'move-to-previous map function' and a 'move-to-next map function'. That is, when the first, second, third, and fourth electronic map browser screens are shown in sequence by a user's manipulation, it is possible to move to the third electronic map browser screen by calling 'previous map'. Thereafter, it is possible to move to the fourth electronic map browser screen by calling 'next map'.

5. Application

Figure 8:
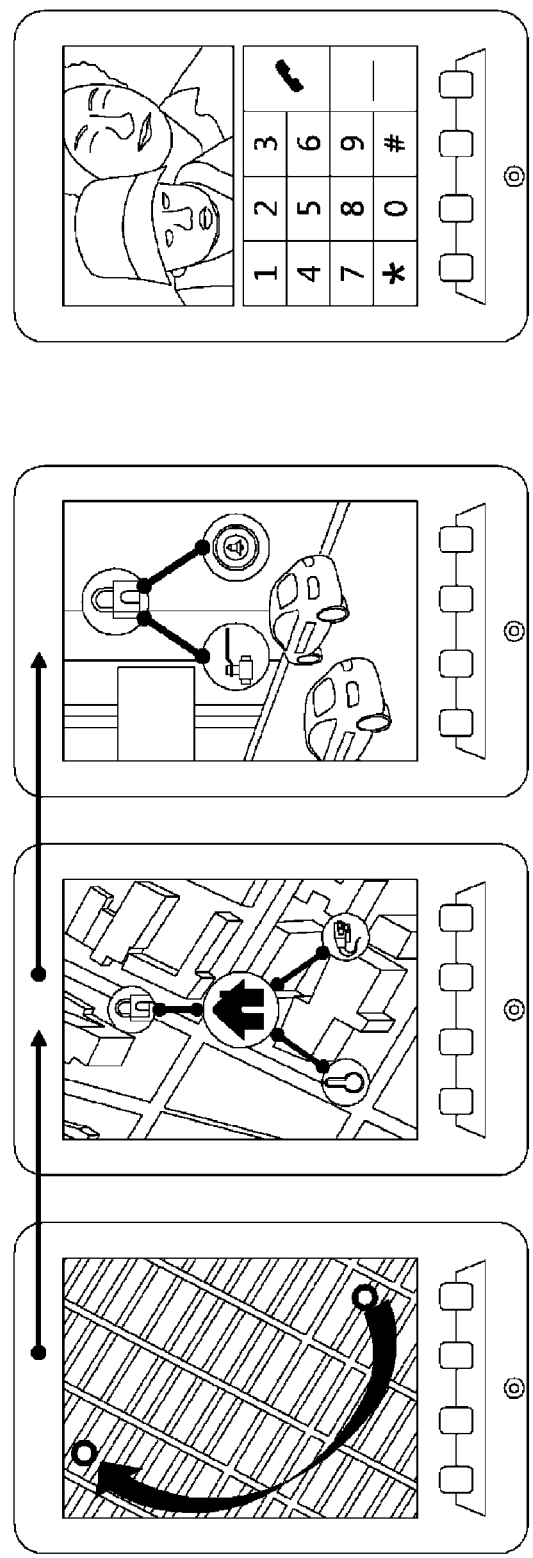
FIG. 8 is a view illustrating an example of a method for making a user terminal to interact with an IoT device by using an electronic map browser and an NUI.

FIG. 8 illustrates an example of a method for making the user terminal 160 interact with the IoT device 130 by using the electronic map browser and the NUI. As shown in FIG. 8, a general map is displayed on the top level, a satellite map is displayed on the higher level, and a road view map is displayed on the lower level.

In addition, referring to FIG. 8, a temperature sensor, a locking device, and an electric cutout, which are devices of the lower level, belong to "home" which is the higher level. The "home" and "locking device" are virtual devices, and the temperature sensor and electricity cutout are real devices.

In addition, referring to FIG. 8, the "locking device" is selected by the user and a "gas locking device" and a "door locking device", which belong to the lower level of the locking device, are displayed on the electronic map browser along with the locking device.

In addition, referring to FIG. 8, the door locking device is selected by the user and a UI of the door locking device is acquired through the network and is displayed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a Network-based User Interface (NUI), the method comprising:
    displaying, by a user terminal, devices connected to a network;
    selecting, by the user terminal, a first device from among the displayed devices;
    acquiring, by the user terminal and from a server through the network, an application which provides a User Interface (UI) controlling the selected first device; and
    executing, by the user terminal, the acquired application for interacting with the selected first device using the UI provided by the executed application,
    wherein the devices are stratified,
    wherein, when the first device is selected, a second device which is a lower level device of the first device is displayed by the user terminal on an electronic map browser,
    wherein a kind of an electronic map of the electronic map browser is changed according to a level of devices displayed on the electronic map browser,
    wherein the selecting comprises
        displaying graphic items, which are assigned to the devices, on an electronic map browser, and
        selecting a graphic item from among the graphic items displayed on the electronic map browser,
    wherein the selected graphic item is assigned to the first device,
    wherein each of the graphic items displayed on the electronic map browser indicates one of a person and a place, and
    wherein the displayed devices comprises a real device physically connected to the network and a virtual device virtually connected to the network, and the real device and virtual device are distinguished from each other by color on the electronic map browser.

2. The method of claim 1, wherein the acquiring comprises
    accessing, by a browser executed in the user terminal, a web page of the server, and
    acquiring, through the accessed web page, the application from the server.

3. The method of claim 1, further comprising:
    requesting, by the user terminal, the server to search devices connected to the network; and
    receiving, from the server, a device list of searched devices,
    wherein the displaying comprises displaying, by the user terminal, the received device list, and
    wherein the selecting comprises selecting the first device from among the devices listed in the displayed device list.

4. The method of claim 1, wherein the user terminal interacts with the first device directly through the network or indirectly via the server.

5. The method of claim 1, wherein the selecting comprises:
    displaying, by the user terminal, the electronic map browser on which the devices are displayed; and
    selecting the first device from among the devices displayed on the electronic map browser.

6. The method of claim 1, further comprising:
    changing, by the user terminal, a screen of the electronic map browser to a previous browser screen or a next browser screen according to a user command.

7. The method of claim 1, wherein the devices are displayed by the user terminal according to a distance from the user terminal to the devices and a security level of a user of the user terminal.

8. A system for providing a Network-based User Interface (NUI) comprising:
    a server configured to
        store applications each comprising a User Interface (UI) for controlling a corresponding one of devices connected to a network; and
    a terminal configured to
        display the devices connected to the network,
        select a first device from among the displayed devices,
        acquire, from the server, the application which provides the UI for controlling the selected first device, and
        execute the acquired application for interaction with the selected first device using the UI provided by the executed application,
    wherein the devices are stratified,
    wherein the terminal is configured to, when the first device is selected, display a second device which is a lower level device of the first device, on an electronic map browser,
    wherein the terminal is configured to change a kind of an electronic map of the electronic map browser according to a level of devices displayed on the electronic map browser,
    wherein the terminal is configured to
        display graphic items, which are assigned to the devices, on an electronic map browser, and
        select a graphic item from among the displayed graphic items,
    wherein the selected graphic item is assigned to the first device,
    wherein each of the graphic items displayed on the electronic map browser indicates one of a person and a place, and
    wherein the displayed devices comprises a real device physically connected to the network and a virtual device virtually connected to the network, and the real device and virtual device are distinguished from each other by color on the electronic map browser.

* * * * *